United States Patent
Banhos et al.

(10) Patent No.: US 11,073,046 B2
(45) Date of Patent: Jul. 27, 2021

(54) GAS TURBINE ENGINE COMPOSITE DUCT WITH BRACKET

(71) Applicant: United Technologies Corporation, Farmington, CT (US)

(72) Inventors: Jonas S. Banhos, Rocky Hill, CT (US); Anthony Prainito, Stamford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 131 days.

(21) Appl. No.: 16/459,985

(22) Filed: Jul. 2, 2019

(65) Prior Publication Data
US 2021/0003037 A1    Jan. 7, 2021

(51) Int. Cl.
*F01D 25/28* (2006.01)
*F02C 7/20* (2006.01)
*F02K 3/04* (2006.01)

(52) U.S. Cl.
CPC ............ *F01D 25/28* (2013.01); *F02C 7/20* (2013.01); *F02K 3/04* (2013.01)

(58) Field of Classification Search
CPC .......... F01D 25/28; F01D 25/243; F02C 7/20; F02K 3/04
See application file for complete search history.

(56) References Cited

U.S. PATENT DOCUMENTS

| | | | | |
|---|---|---|---|---|
| 1,433,324 | A | * | 10/1922 | Wine ............... B61D 7/16 105/280 |
| 7,104,022 | B2 | * | 9/2006 | Burgess .............. E04B 5/12 248/220.21 |
| 8,079,773 | B2 | | 12/2011 | Blanton |
| 8,596,972 | B2 | | 12/2013 | Moon |
| 10,196,937 | B2 | | 2/2019 | Wunsch et al. |
| 2011/0168839 | A1 | | 7/2011 | Porte |
| 2014/0075957 | A1 | | 3/2014 | Bohne |
| 2016/0169046 | A1 | | 6/2016 | Acius |
| 2017/0191448 | A1 | | 7/2017 | Wunsch |

OTHER PUBLICATIONS

Extended EP Search Report for EP Application No. 201836897 dated Sep. 14, 2020.

* cited by examiner

*Primary Examiner* — Steven M Sutherland
(74) *Attorney, Agent, or Firm* — Carlson, Gaskey & Olds, P.C.

(57) ABSTRACT

A bracket assembly for a gas turbine engine includes a first foot that includes at least one flange fastener opening and a duct flange support surface. A second foot includes at least one body portion fastener opening and a duct body support surface. At least one leg connects the first foot relative to the second foot.

16 Claims, 4 Drawing Sheets

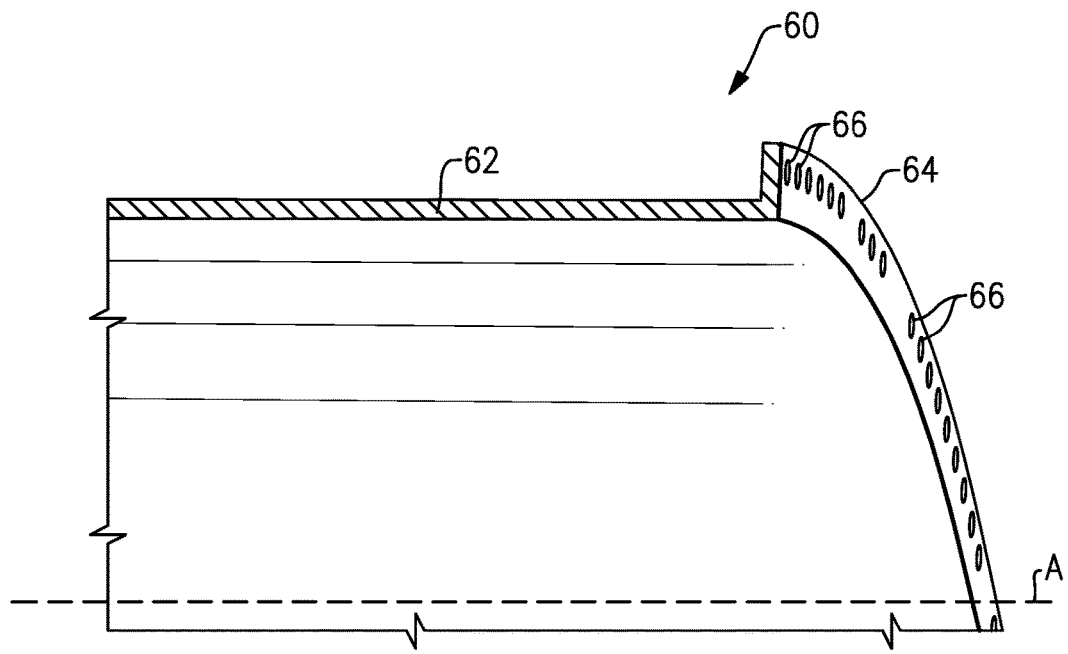
FIG.2
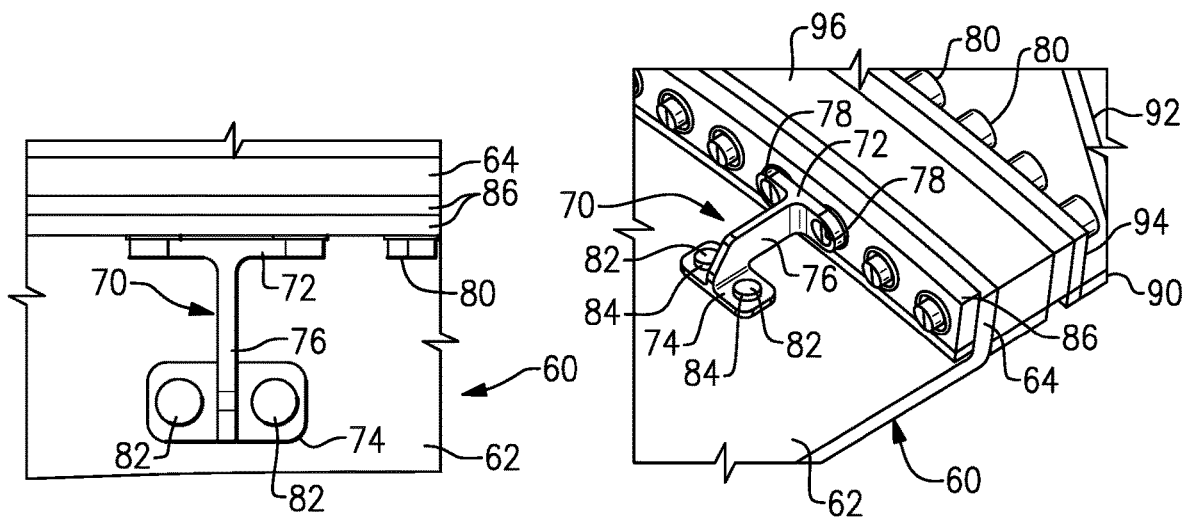
FIG.3
FIG.4

GAS TURBINE ENGINE COMPOSITE DUCT WITH BRACKET

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The fan also directs air through a secondary or bypass flow path. The bypass flow path is typically defined by a duct structure formed from a multiple of portions connected together.

SUMMARY

In one exemplary embodiment, a bracket assembly for a gas turbine engine includes a first foot that includes at least one flange fastener opening and a duct flange support surface. A second foot includes at least one body portion fastener opening and a duct body support surface. At least one leg connects the first foot relative to the second foot.

In a further embodiment of the above, the flange support surface is planar.

In a further embodiment of any of the above, the body portion support surface includes a curvature.

In a further embodiment of any of the above, the duct flange support surface is generally perpendicular to the duct body support surface.

In a further embodiment of any of the above, the at least one flange fastener opening includes of pair of flange fastener openings. The at least one leg is attached to the first foot between the pair of flange fastener openings.

In a further embodiment of any of the above, the at least one body portion fastener opening includes a pair of body portion fastener openings. The at least one leg is attached to the second foot between the pair of body portion fastener openings.

In a further embodiment of any of the above, the first foot is secured to a flange on a composite duct. The second foot is secured to a body portion of the composite duct.

In a further embodiment of any of the above, the flange is integral with the body portion. Fibers from the body portion extend into the flange portion. At least one load spreader separates the first foot from the flange.

In another exemplary embodiment, a gas turbine engine includes a bypass duct that at least partially defines a bypass flow path. A composite duct assembly at least partially defines the bypass flow path. The composite duct assembly includes a composite duct that has a body portion and a flange that extend radially outward from an end of the body portion. A bracket includes a first foot secured relative to the flange. A second foot is secured relative to the body portion. The first foot includes at least one flange fastener opening. The second foot includes at least one body portion fastener opening.

In a further embodiment of any of the above, the first foot includes a first mating surface that is planar. The second foot includes a duct body support surface that has a curvature following a curvature of the body portion of the composite duct.

In a further embodiment of any of the above, the first mating surface is generally perpendicular to the duct mating surface. The bracket includes at least one leg that connects the first foot to the second foot.

In a further embodiment of any of the above, the at least one leg includes a plurality of legs connecting the first foot and the second foot.

In a further embodiment of any of the above, the at least one flange fastener opening includes of pair of flange fastener openings. The at least one leg is attached to the first foot between the pair of flange fastener openings. The at least one body portion fastener opening includes a pair of body portion fastener openings. The at least one leg is attached to the second foot between the pair of body portion fastener openings.

In a further embodiment of any of the above, at least one load spreader separates the first foot from the flange. The flange is integral with the body portion. Fibers from the body portion extend into the flange portion.

In a further embodiment of any of the above, the flange includes a plurality of fastener openings. The at least one flange fastener opening is aligned with a corresponding one of the plurality of fastener openings for accepting a flange fastener.

In a further embodiment of any of the above, a fastener extending through the at least one body portion fastener opening in the second foot and at least partially into the body portion.

In another exemplary embodiment, a method of supporting a flange on a composite duct includes the step of securing a first foot on a bracket relative to a flange on the composite duct. A second foot is secured on the bracket relative to a body portion of the composite duct.

In a further embodiment of any of the above, the method includes aligning at least one flange fastener opening in the first foot with a flange fastener extending through the flange on the composite duct.

In a further embodiment of any of the above, the body portion of the composite duct is engaged with a fastener extending through a duct fastener opening in the second foot.

In a further embodiment of any of the above, the first foot is connected to the second with at least one leg. The first foot includes a duct flange support surface. The second foot includes a duct body support surface that is generally perpendicular to the duct flange support surface and includes a curvature that follows a profile of the body portion of the composite duct.

BRIEF DESCRIPTION OF THE DRAWINGS

FIG. 2 is a sectional view of a composite duct.

FIG. 3 is a top view of an example bracket secured to the composite duct of FIG. 2.

FIG. 4 is a perspective view of the bracket secured to the composite duct of FIG. 2.

DETAILED DESCRIPTION

Figure 1:
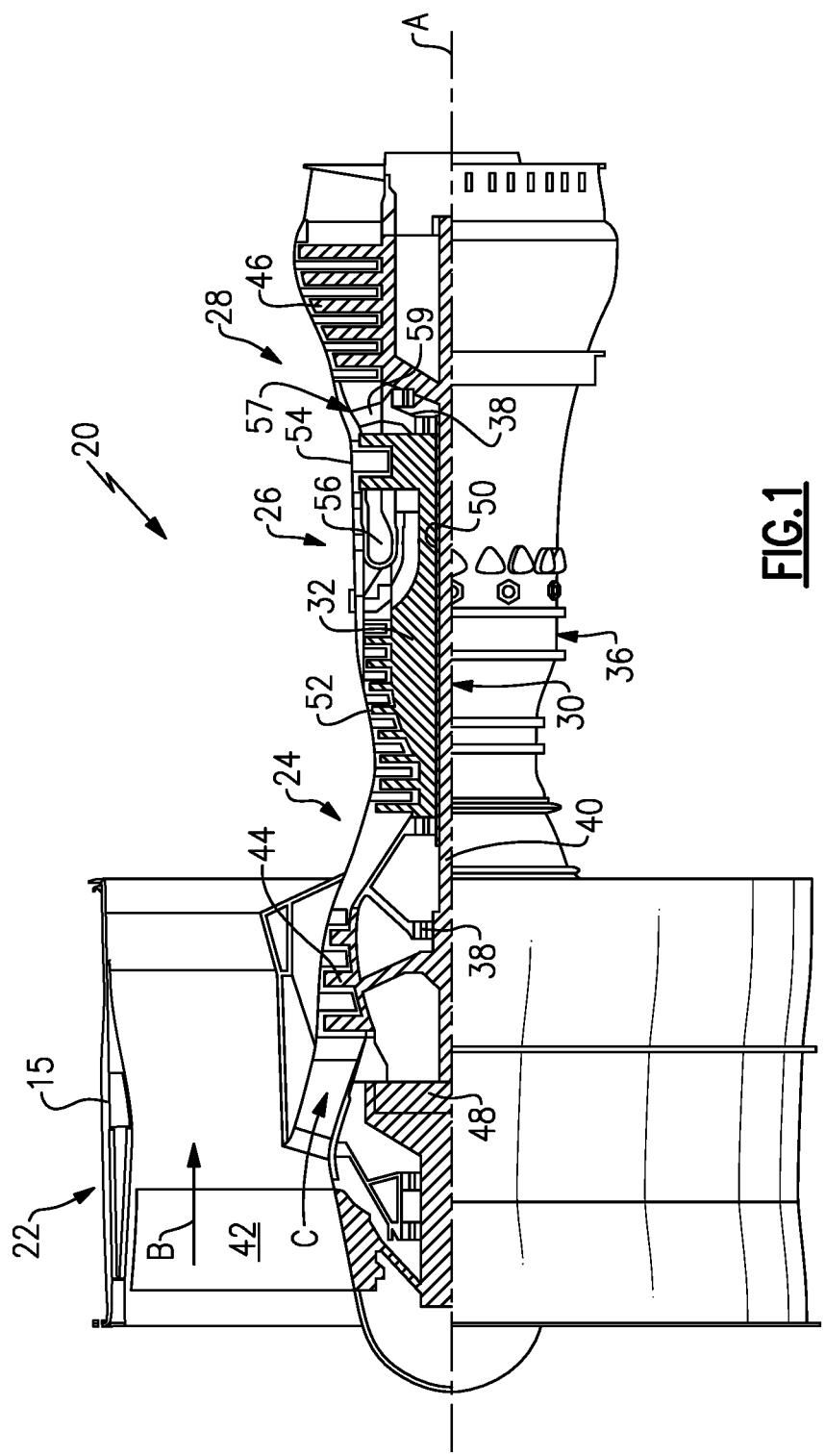
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

FIG. 2 illustrates an example composite duct 60. The composite duct 60 at least partially defines the bypass duct within the housing 15 for transferring air along the bypass flow path B. The composite duct 60 includes a body portion 62 extending in an axial direction and a flange 64 that extends radially outward located at an axial end of the body portion 62. In this disclosure radial or radially and axial or axially as relative to the engine axis A unless described otherwise. The flange 64 includes a plurality of flange bolt openings 66 located circumferentially around the flange 64. The flange 64 could define a single continuous loop with the body portion 62 or the flange 64 and the body portion 62 could include multiple segments that are joined together to form a loop. Although the flange 64 is illustrated as being located on an axially downstream end of the body portion 62, a similar flange could be located on an axially upstream end of the body portion 62 and still benefit from this disclosure.

Because the duct 60 is made of a composite, fibers from the body portion 62 extend into the flange 64. In particular, the flange 64 is subject to bending moments during operation that subject the intersection of the flange 64 and the body portion 62 to increased levels of stress. In order to address the increased level of stress at this intersection, a thickness of the flange 64 and the intersection of the flange 64 and the body portion 62 is thicker than the body portion 62 spaced axially inward from the flange 64.

Figure 5:
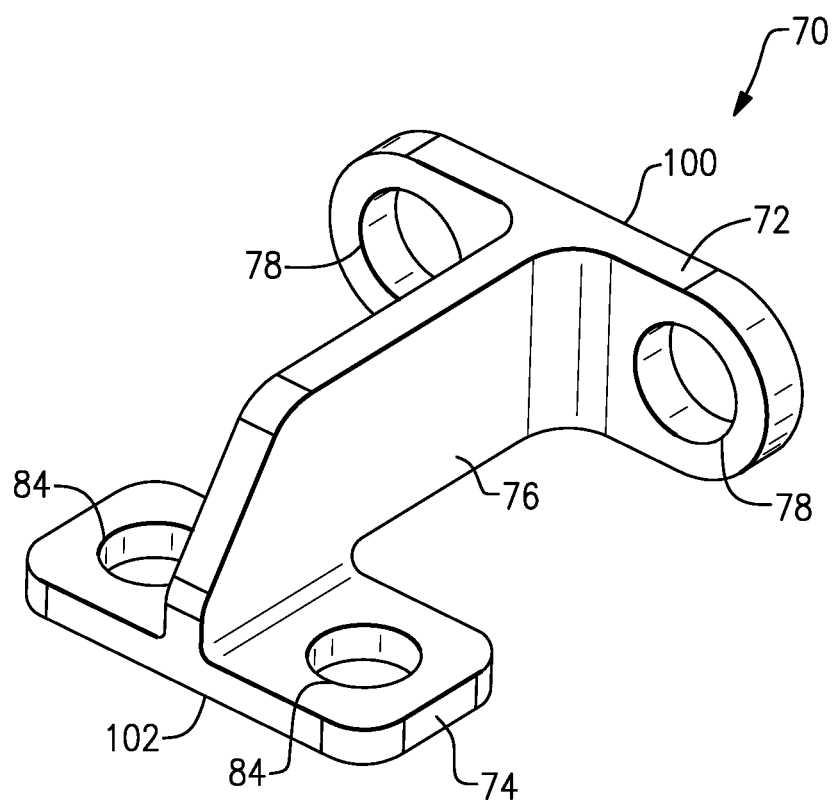
FIG. 5 is a perspective view of the bracket of FIG. 3.

FIGS. 3 and 4 illustrate a bracket 70 secured relative to the composite duct 60. The bracket 70 includes a first foot 72 connected to a second foot 74 with a leg 76. The first foot 72 includes a pair of flange fastener openings 78 that extend through the first foot 72 and are aligned with a corresponding flange fastener 80. The second foot 74 is secured relative to the body portion 62 of the composite duct 60 through a pair of body portion fasteners 82 extending through a corresponding pair of body portion fastener openings 84 (FIG. 5). The body portion fasteners 82 can be secured to the body portion 62 through a nut plate that has been riveted to a hole drilled through the body portion 62 (not shown).

In the illustrated example, the first foot 72 is the flange 64 by two rows of load spreaders 86 to spread loads from the fasteners 80 along a greater surface area of the flange 64. The fasteners 80 connect the flange 64 on the composite duct 60 to a flange 94 extending from a body portion 92 of a secondary duct 90. The load spreaders 86 can include multiple segments that form a loop or a single segment that forms a loop in abutting contact with the flange 64. Although two rows of load spreaders 86 are shown in the illustrated example, more or less than two rows of load spreaders 86 could be used in this disclosure. This disclosure also applies to configurations that do not includes load spreaders 86.

Furthermore, in the illustrated example, the flange 64 on the composite duct 60 is spaced from the flange 94 on the secondary duct 90 by at least one spacer 96. The at least one spacer 96 can provide a structural transition between the composite duct 60 and the secondary duct 90 and/or provide a neutral isolating material to prevent material reaction between the flange 64 and the flange 94. The at least one spacer 96 can also distribute loads along a surface of the flange 64 opposite the load spreaders 86.

As shown in FIG. 5, the leg 76 on the bracket 70 is located between the pair of flange fastener openings 78 on the first foot 72 and the leg 76 is located between the pair of body portion fastener openings 84 on the second foot 74. The first foot 72 also includes a duct flange support surface 100 opposite the leg 76 that can engage the load spreader 86 or the flange 64. Additionally, the duct flange support surface 100 is planar in the illustrated example such that the duct flange support surface 100 is flush against the load spreader 86 or the flange 64.

The second foot 74 includes a body portion contact surface 102 opposite the leg 76 that directly contacts an outer surface of the body portion 62 of the composite duct 60 as shown in FIGS. 3 and 4. The body portion contact surface 102 includes a curvature that follows the profile of the outer surface of the body portion 62. This allows the second foot 74 to sit flush against the body portion 62 to increase load transfer area between the second foot 74 and the body portion 62.

Figure 6A:
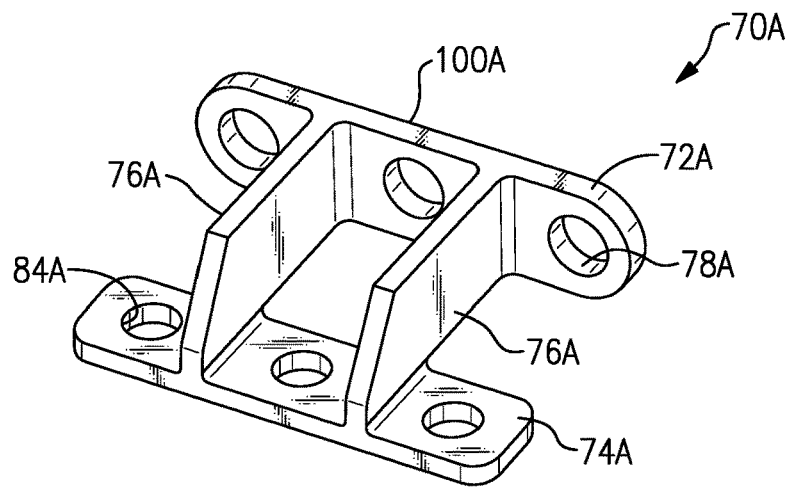
FIG. 6A is a perspective view of another example bracket.
Figure 6B:
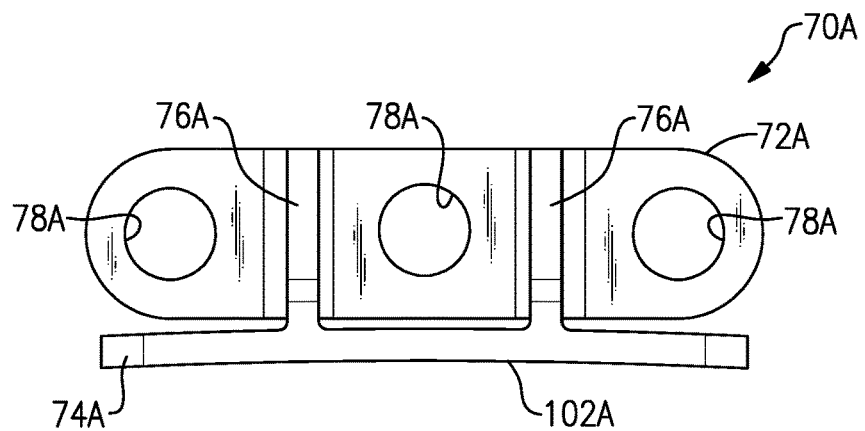
FIG. 6B is a front view of the bracket of FIG. 6A.
Figure 6C:
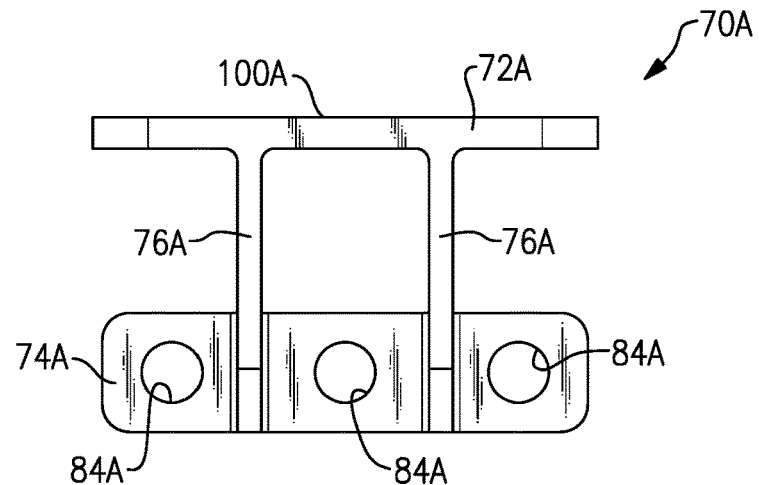
FIG. 6C is a top view of the bracket of FIG. 6A.

FIGS. 6A-6B illustrate another example bracket 70A that is similar to the bracket 70 except where described below or shown in the Figures. The bracket 70A includes a first foot 72A having at least three flange fasteners openings 78A with adjacent flange fastener openings 78A separated by legs 76A. Additionally, each of the flange fastener openings 78A are separated from an adjacent one of the flange fastener openings 78A by one of the legs 76A. This allows the first foot 72A to be secured to more than two of the flange fasteners 80 to provide more support relative to the flange 64 on the composite duct 60. Additionally, because the first foot 72A is engaging more than two flange fasteners 80, the flange fasteners opening 78A are arranged with a curvature to follow a curvature of the flange 64. However, a duct flange support surface 100A on the first foot 72A will remain planar even though an upper and lower edge of the duct flange support surface 100A may have a curvature that follows a curvature about axis A of the flange 64.

Similarly, the bracket 70A includes a second foot 74A having at least three body portion fastener openings 84A with adjacent fastener opening 84A separated by one of the legs 76A. As described above, with respect to the body portion contact surface 102, a body portion contact surface 102A also follows an outer contour of the body portion 62 of the composite duct 60.

Because the flange 64 is integral with the body portion 62 as described above, fibers from the body portion 62 extend into the flange 64. During operation of the gas turbine engine 20 bending forces occur between the flange 64 and the body portion 62 of the composite duct 60. This results in interlaminar stresses located at a transition between the body portion 62 and the flange 64. One feature of this disclosure, is to reduce the interlaminar stresses at the transition between the body portion 62 and the flange 64 as well as in other surrounding areas. In order to accomplish this feature, a plurality of the bracket 70, 70A are located around a circumference of the composite duct 60 to engage the body portion 62 and support the flange 64 to transfer and distribute loads from the flange 64 to the body portion 62.

This transfer of forces diminishes or deflects bending moments applied to the flange 64 to maintain the integrity of the flange 64 and increases the operating life of the composite duct 60. Another feature of using the brackets 70, 70A with the composite duct 60 is that the number of fibers and thickness of the flange 64 and transition between the flange 64 and the body portion 62 can be reduced which will improve the manufacturability of the composite duct 60 by reducing the complexity and thickness of the fiber layup.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A bracket assembly for a gas turbine engine comprising:
   a first foot including a pair of flange fastener openings and a duct flange support surface that is planar;
   a second foot including a pair of body portion fastener openings and a duct body support surface having a curvature following a curvature of the body portion of the composite duct, wherein the duct flange support surface is generally perpendicular to the duct mating surface;
   at least one leg attached to the first foot between the pair of flange fastener openings and the at least one leg is attached to the second foot between the pair of body portion fastener openings.

2. The bracket assembly of claim 1, further comprising a composite having a body portion and a flange extending from an end of the body portion, wherein the first foot is secured to the flange on the composite duct and the second foot is secured to a body portion of the composite duct.

3. The bracket assembly of claim 1, wherein the flange is integral with the body portion and fibers from the body portion extend into the flange and at least one load spreader separating the first foot from the flange.

4. The bracket assembly of claim 1, wherein the at least one leg includes a plurality of legs.

5. A gas turbine engine comprising:
   a bypass duct at least partially defining a bypass flow path; and
   a composite duct assembly at least partially defining the bypass flow path, wherein the composite duct assembly includes:
      a composite duct having a body portion and a flange extending radially outward from an end of the body portion;
      a bracket including a first foot secured relative to the flange and a second foot secured relative to the body portion, wherein the first foot includes at least one flange fastener opening and the second foot includes at least one body portion fastener opening; and at least one load spreader separating the first foot from the flange and the flange is integral with the body portion and fibers from the body portion extend into the flange.

6. The gas turbine engine of claim 5, wherein the first foot includes a first mating surface that is planar and the second foot includes a duct body support surface having a curvature following a curvature of the body portion of the composite duct.

7. The gas turbine engine of claim 6, wherein the first mating surface is generally perpendicular to the duct mating surface and the bracket includes at least one leg connecting the first foot to the second foot.

8. The gas turbine engine of claim 7, wherein the at least one leg includes a plurality of legs connecting the first foot and the second foot.

9. The gas turbine engine of claim 7, wherein the at least one flange fastener opening includes of pair of flange fastener openings and the at least one leg is attached to the first foot between the pair of flange fastener openings and the at least one body portion fastener opening includes a pair of body portion fastener openings and the at least one leg is attached to the second foot between the pair of body portion fastener openings.

10. The gas turbine engine of claim 5, wherein the flange includes a plurality of fastener openings and the at least one flange fastener opening is aligned with a corresponding one of the plurality of fastener openings for accepting a flange fastener.

11. The gas turbine engine of claim 5, including a fastener extending through the at least one body portion fastener opening in the second foot and at least partially into the body portion.

12. A method of supporting a flange on a composite duct comprising the steps of:

securing a first foot on a bracket relative to the flange extending radially outward from an end of a body portion of the composite duct wherein the first foot includes a first mating surface that is planar and a pair of flange fastener openings; and securing a second foot on the bracket relative to a body portion of the composite duct, the second foot includes a duct body support surface having a curvature following a curvature of the body portion of the composite duct and a pair of body portion fastener openings, wherein the first mating surface is generally perpendicular to the duct mating surface and at least one leg is attached to the first foot between the pair of flange fastener openings and the second foot between the pair of body portion fastener openings.

13. The method of claim 12, further comprising aligning at least one flange fastener opening in the first foot with a flange fastener extending through the flange on the composite duct.

14. The method of claim 12, further comprising engaging the body portion of the composite duct with a fastener extending through a duct fastener opening in the second foot.

15. The method of claim 12, wherein the at least one leg includes a plurality of legs.

16. The method of claim 12, further comprising separating the first foot from the flange with at least one load spreader and the flange is integral with the body portion of the composite duct and fibers from the body portion extend into the flange portion.

* * * * *